United States Patent [19]

Smith

[11] 4,355,656

[45] Oct. 26, 1982

[54] PIPELINE PLUG AND BYPASS

[75] Inventor: William B. Smith, Berea, Ohio

[73] Assignee: The Pipe Line Development Company, Cleveland, Ohio

[21] Appl. No.: 258,476

[22] Filed: Apr. 28, 1981

[51] Int. Cl.³ .............. F16K 43/00; F16L 55/10; F16L 55/18

[52] U.S. Cl. .............. 137/318; 138/94; 138/97; 166/55

[58] Field of Search .............. 137/317, 315, 318; 138/94, 97; 166/55, 55.1

[56] References Cited

U.S. PATENT DOCUMENTS

| | | | |
|---|---|---|---|
| 2,171,937 | 9/1939 | Larry et al. | 138/94 |
| 3,833,020 | 9/1974 | Smith | 138/94 |
| 3,863,667 | 2/1975 | Ward | 166/55 |
| 3,867,964 | 2/1975 | Gardner | 138/94 |
| 4,177,827 | 12/1979 | Smith et al. | 138/94 |

Primary Examiner—George L. Walton
Attorney, Agent, or Firm—Pearne, Gordon, Sessions, McCoy & Granger

[57] ABSTRACT

Apparatus adapted to be retrofitted on an existing live pipeline to plug off and isolate a section of the pipe while maintaining flow through an associated bypass circuit. The disclosed apparatus includes a housing to be secured around the pipe and elements operable in the housing to cut into the pipe and establish a closed flow path between one section of the pipe and the exterior of the housing while isolating such flow from a work chamber within the housing and remaining sections of the pipe.

9 Claims, 4 Drawing Figures

PIPELINE PLUG AND BYPASS

BACKGROUND OF THE INVENTION

The invention relates to live pipeline service equipment and, more particularly, to retrofitting apparatus for stopping flow at any desired point in an existing line.

Prior Art

It is often necessary, when isolating an intermediate length of a live pipeline for purposes of reconstruction, repair, replacement or the like, to maintain at least a minimum flow through the remainder of the pipeline system. A known technique involves first hot tapping the pipeline at two points, one upstream and one downstream of the intermediate length of pipe to be operated upon. A branch circuit can then be established between the hot tapping points. A second set of hot taps is made inside the spacing of the first-mentioned or outside set for purposes of introducing plugging devices into the line. When the plugging devices are deployed to isolate the intermediate length of line, flow can be diverted around this intermediate length through the outside taps. This technique has several disadvantages which include the expenditure of time and labor for installing four separate hot tapping units. Such time and labor can be quite significant if not prohibitive when the pipe is in a difficult environment such as underseas. This can be appreciated when it is recognized that the site of each hot tapping unit must first be cleaned and otherwise prepared. Further, each hot tapping unit must be individually proof-tested before entry into the pipeline.

Another technique for isolating a length of pipeline is disclosed in U.S. Pat. No. 3,867,964 to Gardner and assigned to the assignee of the present invention. This patent discloses a pipe plugging device which is capable of establishing a bypass circuit while isolating a length of the pipeline on one side of the unit from the length on the other side. However, as disclosed in the patent, the device employs the working chamber of its housing as part of the bypass circuit. By requiring the housing to perform this duty, the versatility of the device in certain applications is somewhat limited.

SUMMARY OF THE INVENTION

The invention provides in a single apparatus elements for plugging a length of pipeline and simultaneously establishing a bypass circuit that is effectively isolated from a main work chamber of the apparatus. With this work chamber independent of bypass flow, various pipe wall cutting instrumentalities may be extricated from the work chamber after having performed their functions. Further, the section of original pipe not supporting bypass flow may be evacuated or otherwise operated upon without the influence of fluid pressure or flow from the bypass circuit. The disclosed apparatus, by affording both plug-off and bypass functions in a single unit, reduces the number of requisite unit installations. This reduction in the number of required units, in turn, reduces installation time, hardware, and labor costs. These time and labor savings include the elimination of individual proof tests for separate plug-off and bypass units. By reducing the number of units necessary to effectuate plugging and bypassing of a line, the risk of a faulty unit installation and its attendant costs is proportionately reduced.

In its preferred form, the apparatus includes a housing assembled on the pipeline at a desired plugging point. A gate member operates within the housing to shear open the pipeline and plug off primary flow. The gate member, by means of a suitably formed recess, establishes a bypass flow circuit with local wall areas of the housing simultaneously with its pipe plugging operation. Bypass flow passes axially through a sheared pipe end opening created by the gate member, radially outward in the gate recess and axially back over the pipeline for a limited distance. The bypass circuit in the gate member is isolated from the main working chamber of the housing, so that this chamber is not subjected to fluid pressures existing in a pipeline section being diverted.

DESCRIPTION OF THE PREFERRED EMBODIMENT

Figure 1:
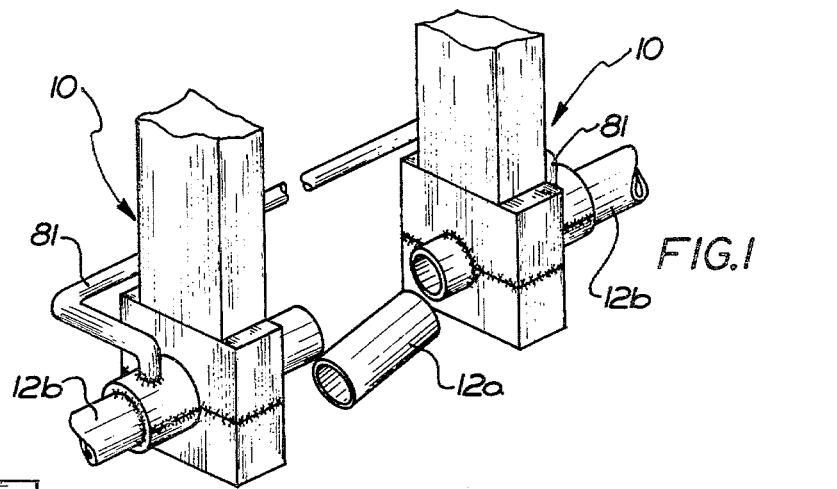
FIG. 1 is a schematic perspective view of a pair of plugging and bypass devices constructed in accordance with the invention and installed at spaced points on a length of pipeline.

Apparatus 10 embodying the invention includes a housing 11 secured to the exterior of a pipeline 12. On the housing 11 is a hydraulic actuator 13 having a rod 14 operable through a compartment 16. Mounted on the free end of the rod 14 is a gate plate 17. The housing comprises a pair of saddle sections 18, 19 each formed as a steel weldment of sufficient mechanical strength to contain the pressure prevailing in the pipeline 12. The saddle sections 18, 19 are joined at a plane 21 diametral to the pipeline 12 by abutting respective opposed faces and continuously welding these sections together along their plane of contact and along their contact with the exterior surface of the pipeline 12. Each of the saddle sections 18, 19 is fabricated in the form of a rectangular box section with their open ends joined at the diametral plane 21.

The saddle sections 18 and 19 cooperate to form opposite housing faces 23, 24. Internally, the housing saddle sections 18, 19 cooperate to form a work chamber 28 which is generally transverse to the pipeline. Prior to installation of the housing sections 18, 19, segments of reinforcing rings 29 may be welded continuously about the circumference of the pipeline 12 at axially spaced planes. The work chamber 28 is closed at the lower housing section 19 by an end cap 31 bolted to a lower face 32 of the lower housing section 19.

With reference to the upper housing section 18, there is provided a cylindrical bore 33 which extends through this housing section in the plane of the work chamber. As indicated, the diameter of the bore 33 is somewhat larger than the axial length of the work chamber 28. A rotary valving member 34 closely fits the cylindrical bore 33. The elongated pinlike valving member 34 has a relatively wide diametral slot running along a major portion of its length. In the angular position of the valving member 34 illustrated in FIG. 2, the slot 36 aligns with the work chamber to permit passage therethrough of the gate plate 17.

At one face 24 of the housing 11, there are provided cooperating semicylindrical, tubular extensions 41, 42 on each of the housing sections 18, 19. Internal flanges 43, 44 at the free ends of the extensions 41, 42 provide semicylindrical surfaces 50 that form a recess adapted to closely fit the external surface of the pipeline 12. The semicylindrical extensions 41, 42 cooperate to form a tubular projection or nipple 45 which is rendered fluidtight by continuous welding at the plane 21 and by continuous welding 48 about the circumference of the pipe at the free end of the nipple. The interior of the nipple 45 is defined by a cylindrical surface 47 formed cooperatively by the inner surfaces of the semi-cylindrical extensions 41, 42. This interior nipple surface 47 is concentric with the exterior surface of the pipeline so as to define an annular space 49 which has its axially outer end bounded by the internal or inwardly extending flanges 43 and associated welds 48.

At the outer end of the nipple 45, this space 49 is closed by the flanges 43, 44. The surface 20 forming the pipe receiving recess or bore on the side of the housing 11 adjacent the nipple 45 is interrupted with a plurality of circumferentially spaced, axially extending slots 51. Remaining between these slots 51 are shoulder segments 52 which afford arcuate surfaces 20a, which are the remnants of the cylindrical surface 20 forming the pipe receiving bore. Study of FIGS. 2 through 4 reveals that these slots 51 are of sufficient axial and radial length to provide communication between the work chamber 28 and annular nipple space 49. Each of the slots 51 provides an individual circuit for conducting fluid between the work chamber 28 and the space 49. The annular nipple space 49 is provided with a port 56 formed by an apertured boss 57 and an associated hole extending radially through the wall of the nipple 45.

Figure 2:
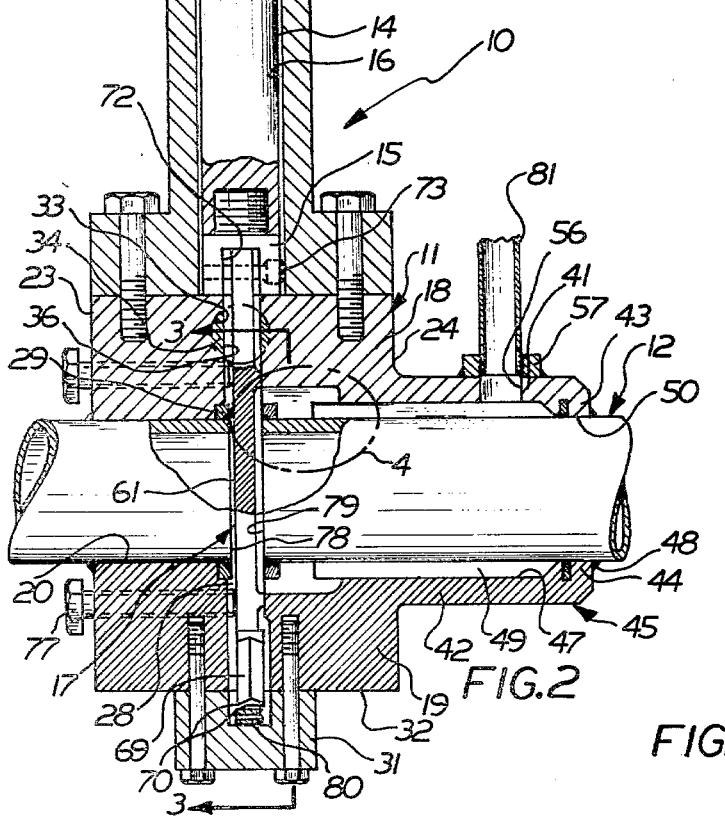
FIG. 2 is a cross-sectional view of a plugging and bypass device taken in a plane parallel to the longitudinal axis of the pipeline.
Figure 3:
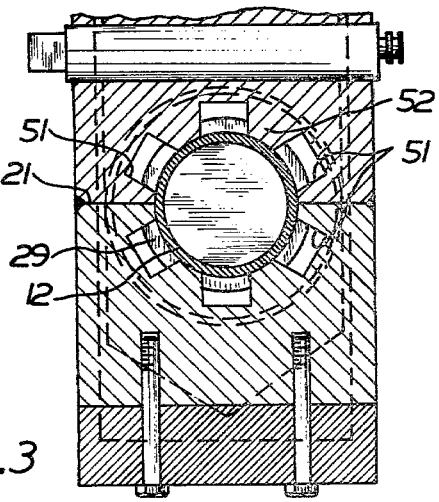
FIG. 3 is a cross-sectional view of the device taken in a plane transverse to the axis of the pipeline illustrated by the line 3—3 in FIG. 2.

The gate unit 17 includes a generally planar main plate body 61. The width of the main plate body 61, i.e., in the direction perpendicular to the plane of the drawing in FIG. 2, is somewhat greater than a circle circumscribing the radially outwardmost regions of the axial slots 51. Facing towards the nipple side of the housing, the main shear plate 61 has an annular projection 64 affording a corresponding, generally planar, annular sealing face 65. The inside diameter of the sealing face 65 is greater than the circle circumscribing the radially outwardmost regions of the axial slots 51. The annular projection 64 surrounds a hollow or cavity 68 machined or otherwise formed on the main plate body 61. At its lower end, the gate unit includes a shear block 69 having axially spaced cutting edges each lying in planes transverse to the pipe axis 70. The shear block 69 may be removably attached to the main plate body 61 by bolts (not shown). At its upper end, the gate unit 17 is coupled to the clevis 15. Such coupling is accomplished by bolts 73 which pass through suitable holes in a portion of the main plate gate body 61 which is received in a slot 72 of the clevis 15. In turn, the clevis 15 is threaded to the rod 14 of the hydraulic actuator 13. The actuator 13 is mounted on the housing 11 by an intermediate fluidtight receiver housing 76, which has sufficient interior dimensions to receive the gate unit 17 when the actuator 13 is initially retracted.

In the maintenance, reconstruction, and like servicing of pipelines, the necessity of temporarily or permanently isolating a length of pipeline already in service may arise. Where no shut-off valve or valves exist to accomplish this isolation, one or more of the apparatus 10 disclosed herein may be employed. FIG. 1 illustrates a situation in which the apparatus is employed in a paired set to block off an intermediate section 12a of pipeline while maintaining a bypass flow through an auxiliary circuit 81. The auxiliary circuit 81 joins the ports 56 of the pair of apparatus 10.

A plurality of thrust screws 77 extending through the wall of the housing 11 are arranged to bear against a side of the gate plate 17 opposite the annular projection 64.

Operation of the gate unit 17 is similar to that disclosed in U.S. Pat. No. 4,177,827, assigned to the assignee of the present invention. With the valving member 34 in the illustrated open position, the gate unit 17 is driven from the compartment 16 by extension of the rod 14 with energization of the actuator 13. The shear cutting edges 70 progressively shear through the wall of the pipe 12 at their respective axially spaced planes to form transverse end faces 78, 79 on the pipeline. An axial segment or coupon 80 of the pipe 12 is flattened while being cut loose from the remaining pipe sections 12a, 12b and is received in the lower end cap 31. It will be understood that the housing 11 and compartment 16 have sufficient structural capacity to contain the pressure existing in the pipeline. The sections 12a, 12b of the pipeline on opposite sides of the work chamber 28 remain essentially undisturbed from their cylindrical shape after the shearing operation. The end faces 78, 79 remain circular by virtue of the support of the reinforcing rings 29 or their equivalents.

The gate unit 17 is extended by the actuator 13 until the annular land or projection 64 is concentrically disposed with the axis of the pipe. At this point, the thrust screws 77 are turned to drive the shear 17 towards the nipple side of the housing 11 and the sealing face 65 into tight sealing engagement with adjacent opposed wall surface areas 83 formed by the interior of the housing 11. With the annular gate surface 65 held in fluidtight engagement against this housing chamber wall area 83 surrounding the pipe end face 79, the fluid in the associated pipe section 12b, to the right in FIGS. 2 and 4, is isolated from communication with the interior of the housing or work chamber 28 and from communication with the other length of pipe 12a.

Figure 4:
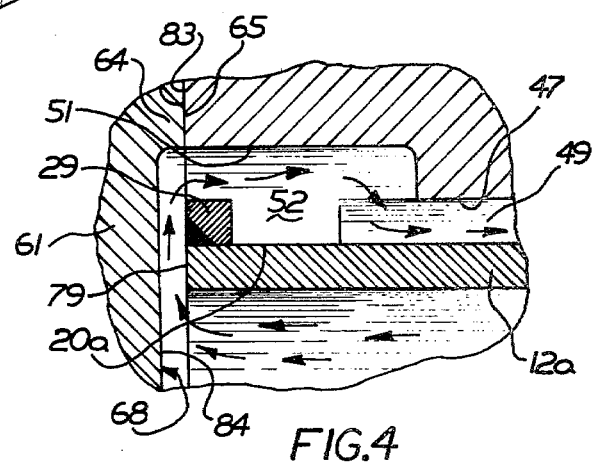
FIG. 4 is an enlarged, fragmentary, cross-sectional view, similar to FIG. 2, of a portion of the device illustrating details of the bypass flow circuit, the area of view being indicated in FIG. 2 by a broken line ellipse.

With reference to FIG. 4, flow lines in the form of arrows indicate a circuit path for fluid in the pipeline. From FIG. 4, it can be seen that the clearance between the sheared pipe end face 79 and end wall 84 of the circular cavity 68 allows radial fluid flow between the pipe interior and the axial housing slots 51. In turn, the slots 51 communicate with the nipple formed annulus 49, and eventually the port 56.

It can be seen that the single circumferential seal formed by the annular gate projection 64 against the interior housing wall surface 83 serves the double function of isolating fluid in the associated pipeline section 12b from the housing work chamber 28 and completes the fluidtight circuit between this pipe section and the port 56.

In FIG. 1, a pair of apparatus are combined, for example, on the pipeline 12 to establish a bypass circuit 81. When shear and plugging operations of the gate unit 17 are completed in each housing 11, the outer reaches or pipeline sections 12b are connected by the circuit 81 and the intermediate section 12a is isolated from these sections. The bypass installation depicted in FIG. 1 represents a significant advance over other known procedures, since only two pieces of apparatus must be installed on the line and procedures for proof-testing their installation simply involve the step of pressurizing the individual work chambers through a suitable tap through the wall of each housing before entering into the pipe.

Once the gate unit of both apparatus 10 have been jacked by the thrust screws 77 into sealing engagement with their opposed housing walls, the work chamber 28 of each apparatus can be evacuated, for example, by removing the lower cap 31. Where it is desired to leave the gate closed for an indefinite period, the clevis 15 between the rod 14 and gate plate 17 can be unbolted from the gate plate and the compartment 16 may be replaced with a blank cap. Where it is desired to remove the gate plate 17 after operations have been completed, the gate plate can be withdrawn from the work chamber 28 by the actuator 13 and the valve member 34 can be rotated 90 degrees to seal off the work chamber. With removal of the compartment 16, a blind plate can be affixed to the housing 11.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

For example, the reinforcing rings 29 may be eliminated where the pipe is first prenotched before operation of the gate plate to shear through the pipeline.

What is claimed is:

1. Apparatus for diverting flow through a pipeline in service, comprising a fluidtight housing for assembly around the pipeline, said housing forming a work chamber around an axial length of pipeline, means operable in the work chamber to cut an opening through the wall of the pipeline, means operable in the housing to seal off one side of the pipeline in a zone adjacent the cut formed by said cutting means from the other side of the pipeline, and passage means for directing bypass flow between said one pipeline side, said opening, and the exterior of said housing, said passage means directing bypass flow through said opening radially around the cut edge of the pipe wall between the cutting means and the cut wall edge, said passage means in the area defined by an axial limit of the cutting means being within the radial extent of the cutting means and, out of said area of the cutting means, extending through a space radially interiorly bounded by said one side of the pipeline and radially exteriorly by said housing thereby completely isolating said bypass flow from said work chamber.

2. Apparatus for diverting flow through a pipeline in service, comprising a fluidtight housing for assembly around the pipeline, said housing forming a work chamber around an axial length of the pipeline, a shear unit operable to cut a transverse axial section free of the pipeline and form a pair of opposed transverse spaced pipe end faces in the housing, means to move a surface carried on the shear unit axially into sealing contact with a surface surrounding the interior of one section of the pipeline after the shear unit has cut through the pipeline, and circuit means partially carried by said shear unit to conduct bypass fluid passing through the plane of the pipeline end face of said one section between the pipe and a point external of said housing, said circuit means confining bypass flow axially between the shear unit and the pipe end face of said one pipeline section, said circuit means in the area defined by an axial limit of the shear unit being within the radial extent of the shear unit and, out of said area of the shear unit, extending through a space radially interiorly bounded by said one pipeline section and radially exteriorly by said housing thereby isolating such bypass fluid from said work chamber.

3. Apparatus for diverting flow through a pipeline in service, comprising a fluidtight housing for assembly around the pipeline, said housing forming a work chamber around an axial length of the pipeline, the work chamber including a wall surface transverse to and surrounding the pipeline, a shear unit operable to cut a transverse axial section from the pipeline and form a pair of opposed, transverse, spaced pipe end faces on remaining pipe sections in the housing, means to move a surface carried on the shear axially into sealing contact with said wall surface in a circumferentially continuous zone about one of said pipeline sections, and circuit means partially carried on said shear to conduct bypass fluid passing through the plane of the end face of said one pipeline section between the pipeline and a point external of said housing, said circuit means confining bypass flow axially between the shear unit and the pipe end face of said one pipeline section, said circuit means in the area defined by an axial limit of the shear unit being within the radial extent of the shear unit and, out of said area of the shear unit, extending through a space radially interiorly bounded by said one pipeline section and radially exteriorly by said housing thereby completely isolating such bypass fluid from said work chamber.

4. Apparatus as set forth in claim 3, wherein said shear unit includes a shallow open cavity indexed into confronting relation with the pipeline end face of said one pipeline section when said shear unit completes a cutting stroke through said pipeline, said circuit including said cavity.

5. Apparatus as set forth in claim 4, wherein said cavity has a diameter somewhat greater than the outside diameter of said pipeline.

6. Apparatus as set forth in claim 5, wherein said circuit includes axial passage means in said housing communicating with said cavity and an external point on said housing.

7. Apparatus as set forth in claim 6, wherein said axial passage means includes a plurality of axially extending paths circumferentially disposed about said one pipeline section.

8. Apparatus as set forth in claim 6, wherein said circuit means includes an annular chamber internally formed by the exterior of said one pipeline section and externally formed by surfaces carried on said housing.

9. Apparatus as set forth in claim 8, wherein said annular chamber is formed between the exterior of said one pipeline section and a nipple extension on said housing.

* * * * *